(12) United States Patent
Oumi et al.

(10) Patent No.: US 6,479,816 B1
(45) Date of Patent: Nov. 12, 2002

(54) NEAR-FIELD OPTICAL PROBE

(75) Inventors: Mamabu Oumi, Chiba (JP); Yasuyuki Mitsuoka, Chiba (JP); Norio Chiba, Chiba (JP); Nobuyuki Kasama, Chiba (JP); Kenji Kato, Chiba (JP); Takashi Niwa, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/426,532

(22) Filed: Oct. 26, 1999

(30) Foreign Application Priority Data

Oct. 27, 1998 (JP) .......................................... 10-305847

(51) Int. Cl.[7] .............................. G21K 7/00; H01J 5/16; G01J 5/08
(52) U.S. Cl. ..................... 250/306; 250/307; 250/310; 250/311; 250/216; 250/227.11
(58) Field of Search ........................... 250/216, 227.11, 250/306, 307, 201.3, 311, 310

(56) References Cited

U.S. PATENT DOCUMENTS

| | | | | |
|---|---|---|---|---|
| 5,410,151 A | * | 4/1995 | Buckland | 250/227.26 |
| 5,627,922 A | * | 5/1997 | Kopelman | 385/12 |
| 5,789,742 A | * | 8/1998 | Wolff | 250/227.11 |
| 5,946,281 A | * | 8/1999 | Ito et al. | 396/112 |
| 5,973,316 A | * | 10/1999 | Ebbesen et al. | 250/216 |
| 6,156,215 A | * | 12/2000 | Shimada et al. | 216/11 |
| 6,215,114 B1 | * | 4/2001 | Yagi et al. | 250/216 |

* cited by examiner

Primary Examiner—John R. Lee
Assistant Examiner—Kalimah Fernandez
(74) Attorney, Agent, or Firm—Adams & Wilks

(57) ABSTRACT

A near-field optical probe with a resolving power exceeding a diffraction limit of light is provided utilizing near-near-field light. A near-field optical probe is formed by a core and a shading film. The core has a tip surface spotted with inwardly depressed points with respect to the surface. This provides within the tip surface a light intensity distribution in a distributed form instead of a conventional rectangle function. Its Fourier expansion is increased in short-wavelength lattice constant component. Utilizing this component, a near-field optical probe is realized having a resolving power exceeding a diffraction limit of light.

33 Claims, 6 Drawing Sheets

NEAR-FIELD OPTICAL PROBE

BACKGROUND OF THE INVENTION

The present invention relates to a near-field optical probe utilizing near-field light to detect an interaction with a microscopic region on the surface of a solid substance, for observation of structural or optical information about a microscopic region less than an input light wavelength or observation of a solid substance surface with high resolution, or utilization for high density information recording and reproduction.

The known probes with a high resolving power utilizing near-field light have been used in near-field optical microscopes and near-field optical heads. Near-field light is produced through a probe tip and interacted with a microscope sample or recording medium, causing propagation light. The detection of such propagation light provides a spatial resolving power exceeding a diffraction limit of light. There also is a method of detecting, by a probe, near-field light caused as a result of an interaction between an incident propagation light and a sample or recording medium. Based on such a principle, the near-field microscope has achieved a resolving power exceeding a diffraction limit of the conventional optical microscope. Meanwhile, the utilization of such a near-field optical probe in a near-field optical head makes feasible data recording with a density surpassing the density on the conventional optical disc.

The applications of near-field light due to the near-field microscope includes one scheme (illumination mode) which brings a probe microscopic aperture and a sample surface into a distance of nearly a diameter of the probe microscopic aperture so that propagation light can be incident through the probe and toward the probe microscopic aperture, thereby producing near-field light in the microscopic aperture. In this case, the produced near-field fight and the sample surface interact with each other, thereby causing scattered light. The scattered light containing an intensity or phase reflecting a sample surface fine structure is detected by a scattered light detection system, thus making feasible high resolution observation previously unachievable by the conventional optical microscope.

Meanwhile, studies have been made on an information recording/reproducing apparatus utilizing near-field light mentioned above.

Many of the today's information reproducing apparatuses use magnetic or optical discs as information recording mediums to reproduce information. In particular, CDs are one kind of optical discs being utilized as mediums to record a large amount of information because they can record information with high density and are mass produced at low cost. The CD is formed, on its surface, with pits in a size of nearly a wavelength of laser light to be used for reproduction and a depth of about a quarter of that wavelength. Thus, reading can be made utilizing light interference phenomenon.

It is general practice to utilize a lens optical system for optical microscopes in reading recorded information from an optical disc such as by the CD. In the case of increasing the density of information recording by reducing the pit size or track pitch, it is impossible to reduce the laser light spot size smaller than a half of the laser light wavelength due to the light diffraction limit problem. Thus, one runs into a wall in that the information recording unit be impossible to is decreased in size to be smaller than a laser light wavelength.

Besides the optical discs, the magnetic discs recording information by the magneto-optical or phase change recording scheme also have realized high density information recording and producing through a laser light microscopic spot. The information recording density is limited to a spot size to be obtained by focusing laser light.

In order to break through the restrictions imposed by the diffraction limit, there is a proposal of an information reproducing apparatus which uses an optical head having a microscopic aperture with a diameter smaller than a wavelength of laser light to be utilized for reproduction, e.g. approximately $\frac{1}{10}$th of the wavelength, to utilize near-field light generated in the microscopic aperture.

The aperture size of a probe is limitative of resolving power where a near-field optical probe is applied as a microscope, and by an information recording density where it is applied as an information processing apparatus. The principle that the near-field optical probe realizes a resolving power or recording density exceeding its light diffraction limit lies in the fact that the light field produced in front of an aperture with a size smaller than a light wavelength contains therein a component having spatially a high frequency (such a component that the light field direction or intensity is different by a slight difference in position) wherein that component interacts with a sample or; recording medium and is scattered into propagation light to be detected. Here, efforts have been made to reduce the aperture size because the resolving power or recording density is improved by increasing the high frequency component within the generated light field.

However, the aperture size is from several tens to several hundreds of nano-meters, and it is difficult to further reduce it in size. This is because the metal film for blocking light leak is deposited with a position control accuracy of about several tens of nano-meters as a size of metal clusters. In order to deposit a film with a sufficient thickness for shading light (approximately 100 nano-meters) around the aperture with the aperture left undeposited, the aperture is difficult to decrease in size smaller than the size currently practiced.

SUMMARY OF THE INVENTION

It is therefore an object of the present invention to provide a near-field optical probe which is capable of increasing a high frequency component of near-field light thereby realizing a high resolving power microscope or high recording density information processing apparatus.

In accordance with the present invention, there is provided a near-field optical probe having a microscopic aperture for generating near-field light or scattering and detecting near-field light to interact with an object, characterized by: a fine structure smaller than the microscopic aperture and formed in or nearby a surface of the microscopic aperture.

This structure increases a high frequency component of a light field distribution on the aperture surface without increasing the size of the aperture itself. There is an increase in a spatial high frequency component of produced near-near-field light. As a result, a component containing finer structural information than the conventional one is increased in a light intensity to be observed, thereby realizing a near-field optical probe for a high resolution microscope or high density information recording apparatus.

Preferably, the fine structure s due to an optical characteristic distribution on or nearby the microscopic aperture surface.

This structure provides a variation in optical characteristic distribution regardless of the aperture size, thereby forming the microscopic structure. Thus, realized is a near-field optical probe for a high resolution microscope or high density information recording apparatus.

More preferably, the optical characteristic distribution is due to a roughening shape in or nearby the aperture surface.

This structure is a modification of merely forming a tip form for the optical probe. Thus, a novel effect is obtainable without major change in the manufacture process.

Still more preferably, the optical characteristic distribution may be due to a distribution of a material in or nearby the aperture surface.

This structure facilitates the selection and control of the material to be filled in the aperture and a particle size thereof. Thus, it is possible to obtain a desired resolving power or recording density.

The microscopic aperture may be a bottom portion of an inverted cone-shaped hole formed through a planar substrate.

This structure provides the probe with a planar form, hence achieving a compact apparatus structure. Furthermore, the planar probe can be fabricated by the use of a semiconductor process technology, thus enabling mass production with high reproducibility. Also, where this is applied for an information processing apparatus, it is possible to utilize it as it is with a head floating mechanism such as in a flying head method used in the conventional hard disc.

Preferably, the microscopic aperture is formed in a tip of a sharpened optical waveguide.

This structure can utilize as a probe an optical fiber type probe as used in the conventional near-field microscope, making it possible to effectively apply the technology developed for the near-field microscopes. Also, the probe can be fabricated by using a semiconductor process technology. Thus, the developed semiconductor process technology is effectively applicable.

More preferably, the microscopic aperture is formed in a sharpened protrusion of a cantilever.

This structure can utilize a cantilever type probe used for the conventional near-field microscopes. Thus, the developed semiconductor process technology is effectively applicable.

DETAILED DESCRIPTION OF THE PREFERRED EMBODIMENTS

Now preferred embodiments of near-field optical probes according to the present invention will be described with reference to the drawings.

(Embodiment 1)

Figure 1:
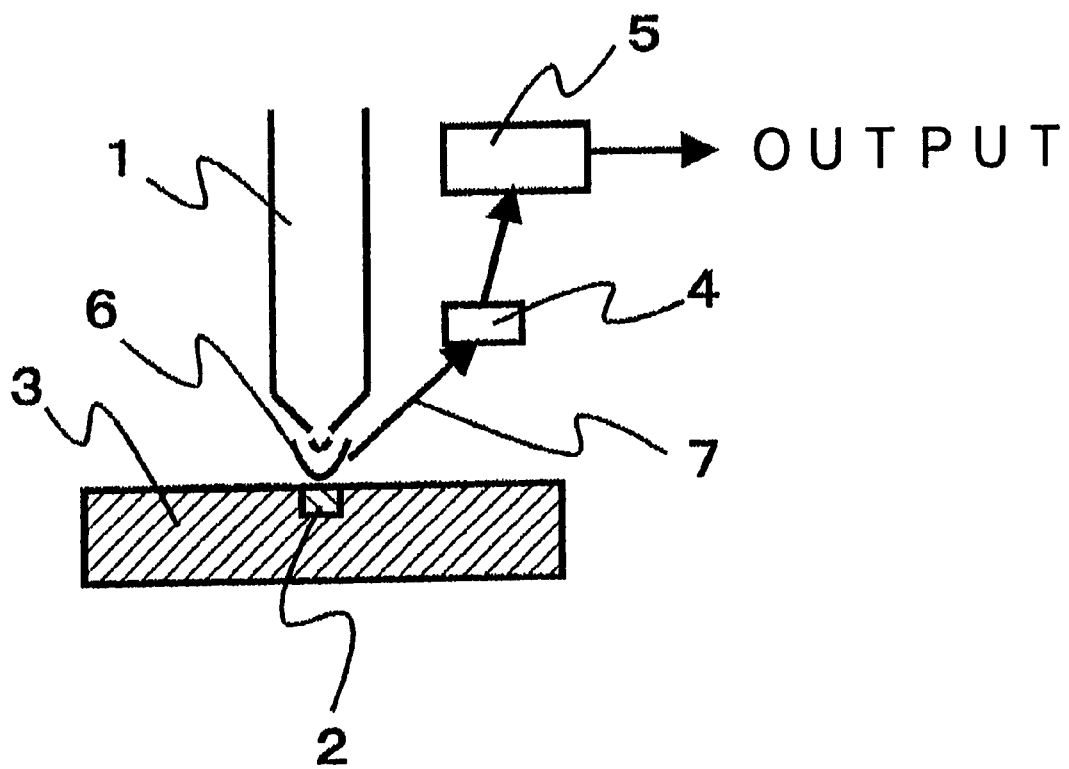
FIG. 1 is a block diagram showing a schematic structure of an information reproducing apparatus utilizing an optical probe according to Embodiment 1.

Referring to FIG. 1, a block diagram is illustrated showing a schematic structure of an information reproducing apparatus utilizing an optical probe according to Embodiment 1 of the invention. In FIG. 1, the information reproducing apparatus utilizing an optical probe of Embodiment 1 includes an near-field optical probe 1 for generating near-near-field light 6, an information recording medium 3 formed with a high density data mark 2, a light detecting element 4 for receiving propagation light 7 scattered by the data mark 2 to output an electric signal, and a signal processing circuit 5 for amplifying the electric signal output from the light detecting element 4 to provide an output.

Figure 2:
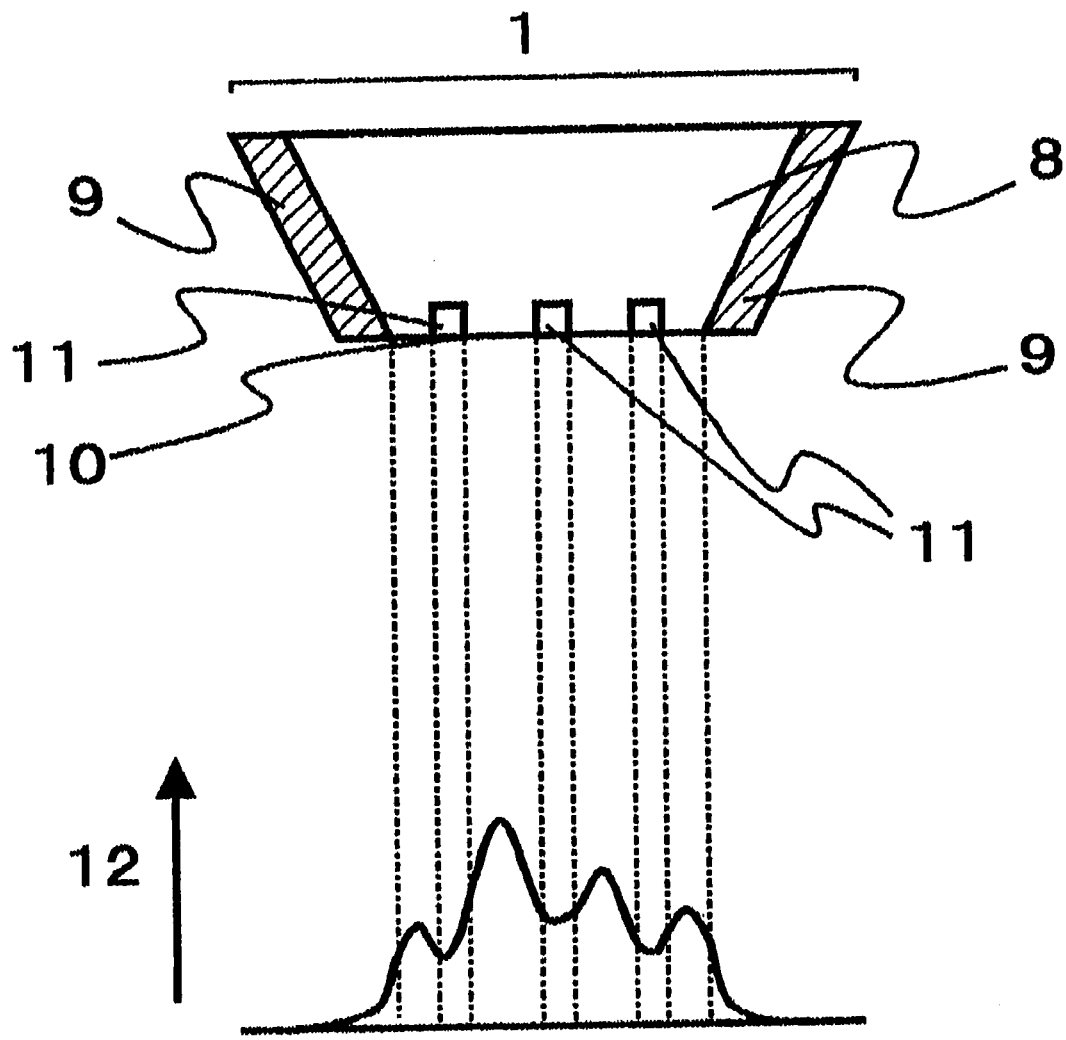
FIG. 2 is a view for concretely explaining a near-field optical probe.

Referring to FIG. 2, a figure is illustrated for explaining concretely a near-field optical probe 1. The near-field optical probe 1 is fabricated by heating, extending, cutting and Al-coating an optical fiber, which is formed by a core 8 and a shading film 9. The core 8 at its tip surface 10 is spotted with points 11 inwardly depressed with respect to the surface. The probe with such a tip is fabricated by conducting chemical etching, such as RIE (Reactive Ion Etching), or Ar or Cr irradiation onto the tip surface perform to ion milling. Ion milling is a process to irradiate ions from above down to an optical fiber or optical probe that is vertically placed with a tip surface positioned atop. In the present embodiment, an optical fiber tip end was placed within a vacuum of $10^{-6}$ Torr and irradiated by $Ar^+$ ions with an acceleration and density of 4.0 kV and 1 mA for 10 minutes. Due to this, a roughened surface was formed in the fiber tip to a size of several tens nano-meters;

This provides the tip surface 10 with a disturbed light intensity distribution 12 that is not of a conventional rectangle function. According to Fourier optics, an aperture can be expressed by a superposition of amplitude diffraction gratings that are different in lattice constant. An aperture having a definite spread can be necessarily developed, due to analytic continuation for a definite function, from a lattice with a longer lattice constant than a wavelength to a lattice with a sufficiently shorter lattice constant than the wavelength. Among them, the shorter lattice constant component, or high component in spatial frequency, produces near-near-field light. In the present embodiment, the light intensity 12 inside the aperture is in the form of a spatially disturbed function instead of a rectangle function so that its Fourier expansion is great in high spatial frequency component.

The near-near-field light interacts with the data mark 2 of the recording medium 3, resultingly producing propagation light 7. The propagation light 7 is distinguished due to an interaction with the corresponding near-near-field light that is high in spatial frequency component even where the data mark 2 is smaller in size than the aperture.

In the present embodiment, measurement was made on the resolving power for a probe prior to forming, by milling, a fine structure in its aperture, for comparison with the resolving power after forming a fine structure. As a result, a probe without having a fine structure in its aperture surface had a resolving power of 200 nm whereas a probe formed with a fine structure had an improved resolving power of 100 nm.

From the above, it is possible to increase the resolving power for a probe without reducing its aperture size. It was revealed that the utilization of such a probe for an information reproducing apparatus makes possible information reproduction with high density.

The present embodiment formed the fine structure in the aperture surface. Similar effect is obtainable by forming an aperture edge into a form with a fine roughened structure in a size of several nano-meters, instead of a conventional circular form, by a similar ion milling technique.

(Embodiment 2)

Figure 3:
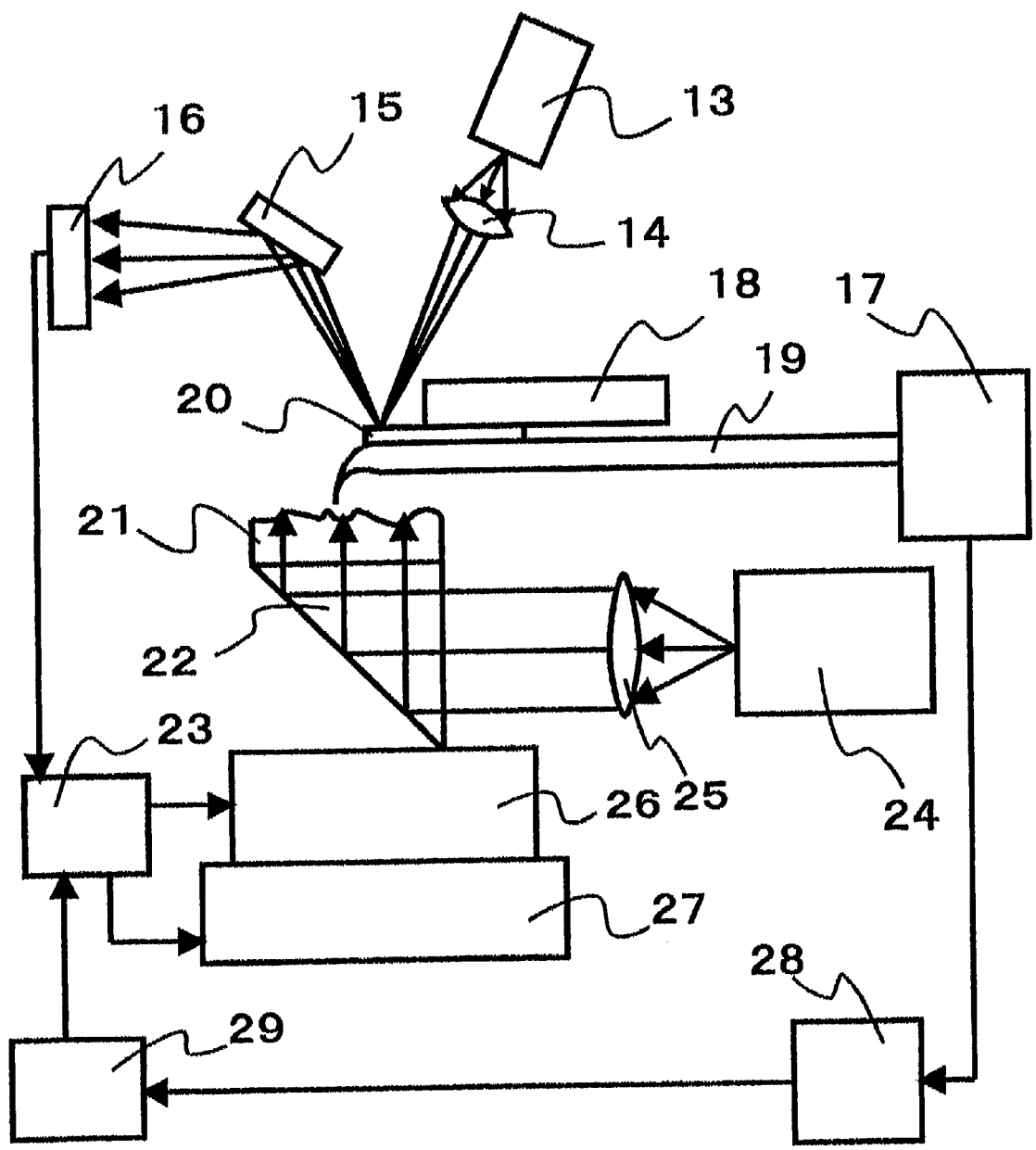
FIG. 3 is a block diagram showing a schematic structure of an information reproducing apparatus utilizing an optical probe according to Embodiment 2.

Referring to FIG. 3, a block diagram is illustrated showing a schematic structure of a near-near-field light microscope utilizing a near-field optical probe according to Embodiment 2 of the invention. In FIG. 3, arranged above a probe 19 are a laser light source 13, a focusing lens 14, a mirror 15, and a photoelectric converting element 16 vertically divided into two. The light emitted from the laser light source 13 is focused by the focusing lens 14 onto a probe top surface 20 on which the light is reflected and then incident through the mirror 15 to the photoelectric converting element 16. Meanwhile, the light emitted from light source 24 for optical information measurement is illuminated through a collimate lens 25 to a backside of a sample 21 placed on a prism 22 having a slant surface with total reflection treatment. Then the light is incident to the other end of the probe 19 close to the sample 21 and further to the photoelectric converting element 17.

The prism 22 and the sample 21 are placed on a rough movement mechanism 27 and fine movement mechanism 26 which are to be moved in x-y-z directions. The photoelectric converting element 16 detects a signal and sends it to a servo mechanism 23. On the basis of this signal, the servo mechanism 23 performs control on the rough movement mechanism 27 and the fine movement mechanism 26 so that the probe 19 cannot be deflected exceeding a prescribed value during approaching of the probe 19 to the sample 21 or upon surface observation. The servo mechanism 23 is connected with a computer 29 to control the fine movement mechanism 26 to operate in a plane direction and receive information on a surface topology from a control signal of the servo mechanism 23. The photoelectric converting element 17 has a signal to be connected to an analog input interface of the computer 29 through a lock-in amplifier 28 in the case where the light of the light source 24 applied by modulation or vibration is caused between the probe 19 and the sample 21. Thus, optical information is detected in synchronism with plane operation of the fine movement mechanism 26. Where no modulation or the like is applied to the light source 24, the signal of the photoelectric converting element 17 is connected not through the lock-in amplifier 28 but directly to the analog input interface of the computer 29.

The optical probe used in the present embodiment is the same as that used in Embodiment 1, and hence explanations are omitted for its detailed structure and preparation method.

The optical probe thus structured has an optical characteristic (reflectivity) on the surface of the tip aperture not in flat but in a varied distribution. That is, although the aperture size is the same as that of the conventional probe, the aperture optically has a same effect as a finer structure formed inside the aperture. The near-near-field light caused on the sample 21 surface has an intensity distribution containing fine structural information about the sample 21 surface. The optical probe, when interacting with such near-near-field light, has a smaller distribution form of an optical characteristic of within the tip aperture surface than the size of the aperture. Consequently, the optical probe interacts with the near-near-field light containing fine structural information about the sample 21 surface, providing propagation light to be propagated and detected through an inside of the optical probe.

In the present embodiment, measurement was made on the resolving power of a near-near-field light microscope utilizing an optical probe having a not-formed tip similarly to Embodiment 1. Thereafter, the tip is formed and similarly measured in resolving power for comparison. As a result, the microscope with the optical probe before tip forming had a resolving power of approximately 200 nm whereas the microscope possessing the after-forming optical probe provided an resolving power of approximately 100 nm.

In this manner, the near-near-field light microscope could be improved in resolving power without reducing the aperture size.

(Embodiment 3)

Figure 4:
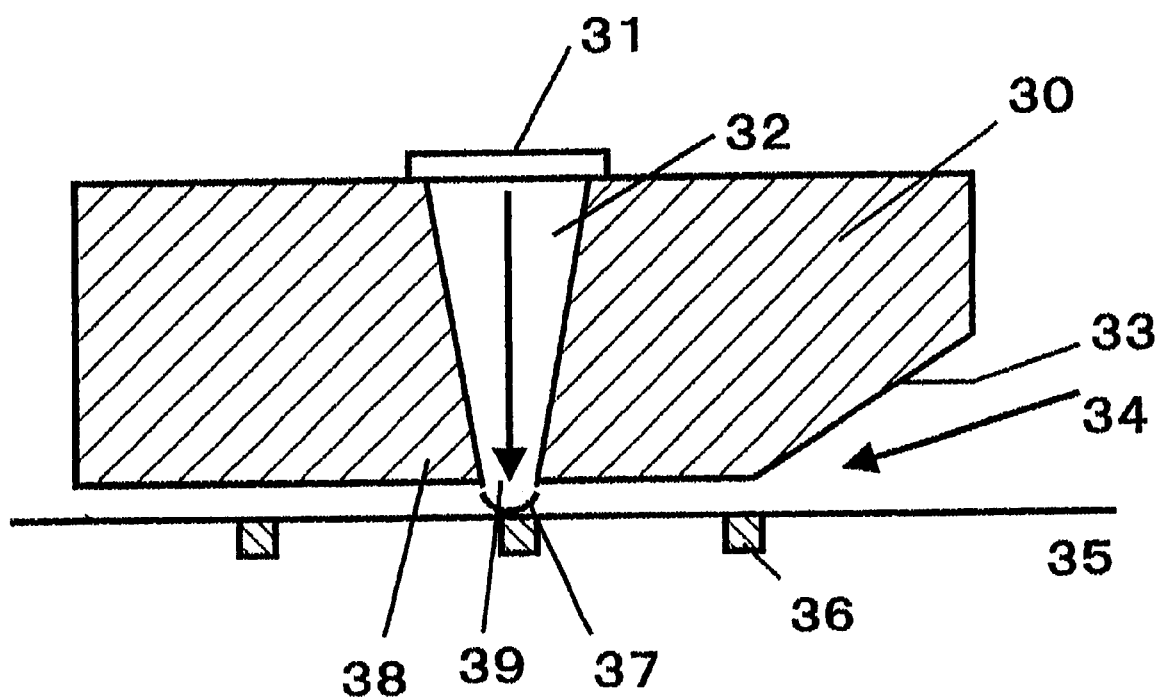
FIG. 4 is a view for explaining Embodiment 3 wherein a near field optical probe is utilized in a planar form and utilized in a high density information recording/reproducing apparatus.

Referring to FIG. 4, there is shown a figure for explaining Embodiment 3 wherein a near-field optical probe is fabricated in a planar form utilizing a semiconductor process technology and utilized in a high density information recording/reproducing apparatus. More specifically, the figure shows a recording medium sectional structure as well as the position to access the same recording medium. A slider 30 is held by a suspension arm (not shown). The suspension arm and slider 30 constitute a float head mechanism. The suspension arm has a voice coil motor as a drive source and is swung about a swing axis. A taper 33 is provided in a scan direction of the slider 30. The taper 33, slider bottom surface 38 and recording medium 35 surface form an air passage 34 in a wedge form. The slider 30 is applied by a load toward the recording medium 35 by the suspension arm and gimbal spring. The slider 30 is to be positioned on a track of a recording medium 35 through seek control and following control. The rotation of the recording medium structurally causes the slider to scan relatively to the recording medium. The slider 30 is opened by a hole in an inverted cone form to provide a light passage 32. The light passage 32 is filled with a glass material to transmit through visible light. The light passage 32 has its tip as a microscopic aperture 39 in a bottom surface of the slider 30, and an opposite end (top of the inverted cone hole) is covered by a light emitting element 31 bonded on a top surface of the slider 30. The microscopic aperture 39 has a fine roughened structure formed through ion milling as explained in Embodiment 1. The recording medium 35 is formed thereon with a data mark 36 to contain unit data.

The slider thus constructed is fabricated by a semiconductor microlithography technique, such as anisotropic etching. The light emitting element 31 emits light to be incident through the light passage 32 to the microscopic aperture 39. Here, because the microscopic aperture 39 is smaller than a light wavelength, a light field based on near-near-field light 37 is caused on a recording medium 35 side in the microscopic aperture 39. The near-near-field light 37 and the data mark 36 interacts thereby effecting data recording/reproducing. The output signals obtained in time series are information about the presence or absence of data marks in time. These together with the rotational velocity of the recording medium provides for information on data mark positions on the recording medium.

Similarly to Embodiments 1 and 2, the light distribution within the microscopic aperture surface is not in a rectangle function but in a disturbed form due to the fine roughened structure in that surface, thus containing a spatially high frequency component. This manner is similar to that of FIG. 2 in Embodiment 1. Due to the near-field-corresponding to this high frequency component, or short wavelength, even if the data mark 36 is smaller than the aperture size, it is possible to distinguish the data mark by an interaction with the corresponding near-near-field light greater in wavelength component thereto. Thus, information recording/reproducing becomes feasible with high density.

(Embodiment 4)

The present embodiment used an SiN-formed cantilever with an aperture, instead of an optical fiber, in the near-field optical probe 1 implemented in Embodiment 1. The cantilever, which is of a type generally used in the atomic force microscope (AFM), was fabricated through use of a generally known three-dimensional micro-lithography technique for wafers. Thereafter, Al was film-formed at other portions than a sharp tip thus forming an aperture at the tip. Ion milling as practiced in Embodiment 1 was conducted on the aperture to thereby form a fine structure in its aperture surface. Due to this, the light distribution on the aperture surface contains much a high spatial frequency component, or short wavelength component. Thus, high density information recording/reproducing was realized without reducing the aperture size.

Also, due to the utilization of the cantilever type probe instead of an optical fiber for the optical probe, the probe fabricated was small in spring constant but high in resonant frequency. The probe with a decreased spring constant made possible scanning in a small state of interaction between the probe and the recording medium surface, thereby reducing damage to the probe tip or recording medium surface. Also, the probe with an increased resonant frequency facilitates the probe to follow the roughening on the recording medium surface, thus enabling scanning at high speed.

(Embodiment 5)

Figure 5:
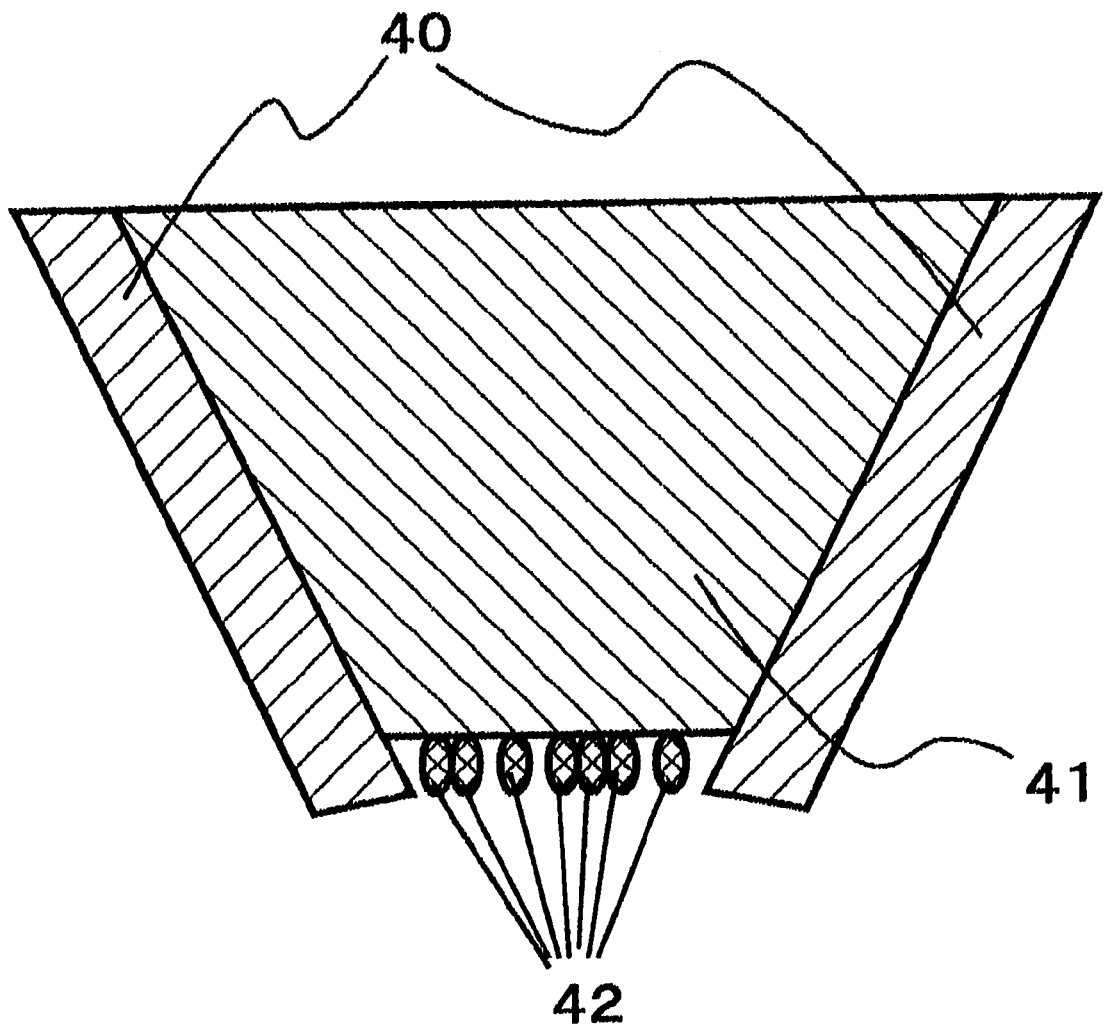
FIG. 5 is a view showing a tip structure of a near-field optical probe according to Embodiment 5.

Referring to FIG. 5, there is illustrated a tip structure of the near-field optical probe of Embodiment 5. The optical probe was fabricated by heating, extending to sharpening, and Al-coated the tip of the optical fiber. The tip has an Al film 40 covering a core 41 of the fiber. The core has an end face chemically bonded with styrene molecule aggregation 42 by silane coupling. The silane coupling is meant to couple an organic molecule to a Si atom dangling bond on a probe tip surface, forming a structure as in FIG. 5. The styrene molecule aggregation 42 layer is an aggregation of styrene molecules that are not in a particularly-ordered structure. Considering the entire aggregation as one structure, the optical characteristic (reflectivity) therein has a complicated distribution. Due to this, the light intensity on the aperture surface contains a spatially high frequency component instead of a conventional rectangle function, as shown in FIG. 2. As was explained in Embodiment 2, a high resolving power of a microscope using a near-field optical-probe was obtained by utilizing a near-field short wavelength component, or high frequency component. By making complicated spatially the light distribution on the aperture surface, obtained was a high resolving power near-field microscope.

Furthermore, the advantage of using silane coupling lies in that the light distribution on the aperture surface can be easily varied by such a method as to chemically modify the organic molecules coupled at the aperture or change a molecular length. In the present embodiment, coupling of styrene molecule aggregation 42 is made at the aperture surface. A similar effect is obtainable by such aggregation is formed several hundreds of nano-meters inward of the aperture surface and its bottom is coated with the same material as the core of the optical fiber.

(Embodiment 6)

The present embodiment utilized the near-field optical probe fabricated in Embodiment 5 in the high density information recording/reproducing apparatus practiced in Embodiment 1. The structure and forming method of the near-field optical probe are the same as those of Embodiment 5. The near-field optical probe has, at the tip aperture surface, a light intensity that is not of a conventional rectangle function but contains a spatially high frequency component as shown in FIG. 2. As was explained in Embodiment 2, the information recording density could be increased by utilizing a high frequency component of a near field without reducing the aperture size.

(Embodiment 7)

Figure 6:
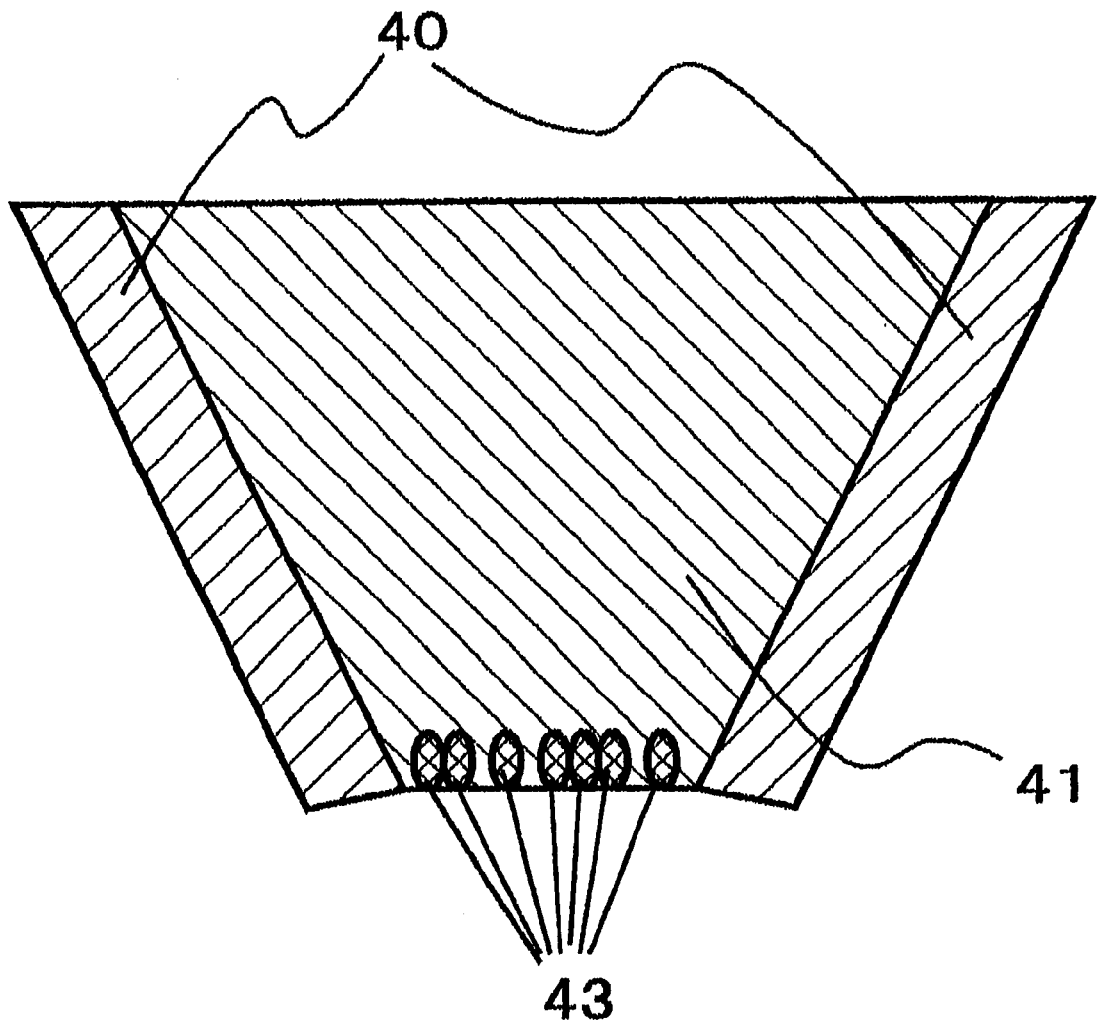
FIG. 6 is a view showing a tip structure of a near-field optical probe according to Embodiment 7.

Referring to FIG. 6, illustrated is a tip structure for a near-field optical probe of Embodiment 6. The difference from FIG. 5 lies in that the present embodiment has a structure that the optical fiber core 41 at its tip has boron ion clusters 43 buried through ion implantation. The boron ion clusters have a mean diameter of approximately 10 nm. The optical characteristic (reflectivity) at the tip surface is not even but has an on-surface distribution. This provides a light intensity distribution that is not in a conventional rectangle function but contains a spatially high frequency component, as shown in FIG. 2. This optical probe was utilized in the information recording/reproducing apparatus practiced in Embodiment 1. As was explained in Embodiment 1, the utilization of a near-field high frequency component could raise the information recording density without decreasing the aperture size. Although in the present embodiment the boron ion clusters are buried in the tip surface of the optical probe, the clusters even if buried several hundreds nanometers inward of the tip surface provides a similar effect.

(Embodiment 8)

The present embodiment utilized the near-field optical probe fabricated in Embodiment 7 in the near-field optical microscope practiced in Embodiment 2. As was explained in Embodiment 2, a high resolving power of a microscope using a near-field optical probe was obtained by utilizing a near-field short wavelength component, or high frequency component. The near-field microscope with a high resolving power was obtained by making complicated the aperture surface light distribution.

According to the invention, in or nearby a microscopic aperture is formed a fine structure smaller than the microscopic aperture. Accordingly, a near-field probe is easily fabricated at low cost but high reproducibility and yield are possible without reducing the optical size and light amount. Thus, utilization is possible for a high resolution near-field microscope or high density information recording/reproducing apparatus that is easy to control resolving power.

By providing the fine structure due to an optical characteristic distribution on or nearby the microscopic aperture surface, the optical characteristic distribution can be varied regardless of the aperture size, thereby forming the microscopic structure. Thus, realized is a near-field optical probe for a high resolution microscope or high density record information processing apparatus.

By providing the optical characteristic distribution due to a roughening shape in or nearby the aperture surface, a modification can be made by merely forming a tip form for the optical probe. Thus, a novel effect is obtainable without making major change to the manufacture process.

By providing the optical characteristic distribution due to a distribution of a material in or nearby the aperture surface, the material to be filled in the aperture and a particle size thereof is facilitated to select and control. Thus, it is possible to obtain a desired resolving power or recording density.

By providing the microscopic aperture a bottom portion of an inverted cone-shaped hole formed through a planar substrate, achieved is a more compact apparatus structure. Furthermore, the planar probe can be fabricated by the use of a semiconductor process technology thus enabling mass production with high reproducibility. Also, where this is applied for an information processing apparatus, it is possible to utilize as it is a head floating mechanism such as in a flying head method used in the conventional hard disc.

By providing the microscopic aperture formed in a tip of a sharpened optical waveguide, it is possible to utilize an optical fiber type probe as used in the conventional near-field microscope, making it possible to effectively apply the technology developed for the near-field microscopes. Also, because the probe can be fabricated by using a semiconductor process technology, the developed semiconductor process technology is effectively applicable.

By providing the microscopic aperture formed in a sharpened protrusion of a cantilever, a cantilever type probe used for the conventional near-field microscopes can be utilized. Thus, the developed semiconductor process technology is effectively applicable.

What is claimed is:

1. A near-field optical probe comprising:
    a supporting member; a microscopic aperture formed at a tip of the supporting member for generating near-near-field light or scattering and detecting near-near-field light to interact with an object; and a fine structure having features smaller than a diameter of the microscopic aperture formed in or nearby a surface of the microscopic aperture.

2. A near-field optical probe according to claim 1; wherein the fine structure comprises an optical characteristic distribution on or nearby the microscopic aperture surface.

3. A near-field optical probe according to claim 2; wherein the optical characteristic distribution is due to surface roughening in or nearby the microscopic aperture surface.

4. A near-field optical probe according to claim 2; wherein the optical characteristic distribution comprises a distribution of a material in or nearby the microscopic aperture surface.

5. A near-field optical probe according to any one of claims 1 to 4; wherein the microscopic aperture comprises one side of a cone-shaped hole formed through a planar substrate.

6. A near-field optical probe according to any one of claims 1 to 4; wherein the supporting member having the tip formed with the microscopic aperture is a sharpened optical waveguide.

7. A near-field optical probe according to any one of claims 1 to 4; wherein the supporting member having the tip formed with the microscopic aperture is a cantilever having a sharpened protrusion.

8. A near-field optical probe according to claim 1; wherein the supporting member comprises an optical fiber having a sharpened tip terminating in the microscopic aperture, the optical fiber being coated with a light-shielding film except for the microscopic aperture.

9. A near-field optical probe according to claim 8; wherein the sharpened tip is formed by heating the optical fiber, extending the optical fiber and cutting the optical fiber.

10. A near-field optical probe according to claim 1; wherein the fine structure comprises depressions formed in the microscopic aperture surface.

11. A near-field optical probe according to claim 10; wherein the depressions comprise etched depressions.

12. A near-field optical probe according to claim 10; wherein the depressions comprise ion-milled depressions.

13. A near-field optical probe according to claim 12; wherein the ion-milled depressions are milled in a vacuum using argon ions at an acceleration of about 4.0 kV at about 1 mA.

14. A near-field optical probe according to claim 1; wherein the fine structure is formed along an edge of the microscopic aperture.

15. A near-field optical probe according to claim 1; wherein the fine structure comprises plural recesses having a diameter of several nanometers formed in the microscopic aperture.

16. A near-field optical probe according to claim 1; wherein the support member has an optical waveguide formed therein.

17. An optical probe comprising: an optical waveguide having a sharpened tip; an aperture portion for passing light therethrough formed at an end of the tip; and a surface pattern formed in a surface of the aperture portion for disrupting light.

18. An optical probe according to claim 17; wherein the optical waveguide comprises an optical fiber having a sharpened tip terminating in the aperture portion and being coated with a light-shielding film except at the aperture portion.

19. An optical probe according to claim 18; wherein the sharpened tip is formed by heating the optical fiber, extending the optical fiber and cutting the optical fiber.

20. An optical probe according to claim 17; wherein the surface pattern comprises depressions formed in the surface of the aperture portion.

21. An optical probe according to claim 20; wherein the depressions comprise etched depressions.

22. An optical probe according to claim 20; wherein the depressions comprise ion-milled depressions.

23. An optical probe according to claim 22; wherein the ion-milled depressions are formed in a vacuum using argon ions at an acceleration of about 4.0 kV and at about 1 mA.

24. An optical probe according to claim 17; wherein the surface pattern is formed along an edge of the aperture.

25. An optical probe according to claim 17; wherein the surface pattern comprises plural recesses having a diameter of several nanometers formed in the aperture.

26. An optical probe according to claim 17; wherein the optical waveguide comprises a support member in which the optical waveguide is formed.

27. A probe microscope for observing a sample, comprising: an optical waveguide probe having a sharpened end provided with an aperture portion for passing light, a surface of the aperture portion having formed thereon a surface pattern for disrupting light passing therethrough; a light source and optics for irradiating the sample with light; a photoelectric converter and optics for receiving at least one of a light transmitted through the sample and the waveguide probe; a laser source for producing laser light used for detecting deflections of the probe during scanning movement of the probe across a surface of the sample; a lens for directing the laser light to a reflective surface of the probe; detecting means for detecting light reflected from the reflective surface; moving means for causing relative movement between the sample and the probe; and control means for controlling a distance between the surface of the sample and a front end of the probe.

28. A probe microscope according to claim 27; wherein the surface pattern has features smaller than a diameter of the aperture portion.

29. A head mechanism for a data storage device, comprising: a support member for undergoing controlled movement with respect to a data storage medium and being connectable to a mechanism for swinging the support member about a swing axis; and an optical waveguide supported by the support member and having an aperture portion formed therein for passing light, a surface of the aperture portion having formed thereon a surface pattern for disrupting light passed therethrough.

30. A head mechanism for a data storage device according to claim 29; wherein the surface pattern has features smaller than a diameter of the aperture portion.

31. A head mechanism for a data storage device according to claim 29; wherein the optical waveguide is formed in the support member.

32. A head mechanism for a data storage device according to claim 31; wherein a portion of the support member in the shape of an inverted cone is removed from the support member and the optical waveguide is formed in the shape of an inverted cone in the removed portion of the support member so that the aperture portion comprises a tip of the inverted cone.

33. A head mechanism for a data storage device according to claim 31; wherein the support member is formed of a semiconductor material.

* * * * *